United States Patent [19]
Rawcliffe

[11] 3,991,840
[45] Nov. 16, 1976

[54] WEIGHING DEVICES

[75] Inventor: John Rawcliffe, Manchester, England

[73] Assignee: The University of Manchester Institute of Science & Technology, Manchester, England

[22] Filed: July 14, 1975

[21] Appl. No.: 595,636

[30] Foreign Application Priority Data
July 12, 1974 United Kingdom............... 31051/74

[52] U.S. Cl.................................. 177/210; 177/229; 235/92 WT; 340/195
[51] Int. Cl.²...................... G01G 3/08; G01G 7/00
[58] Field of Search............................ 177/210, 229; 235/92 WT; 340/195, 196, 199

[56] References Cited
UNITED STATES PATENTS

| | | |
|---|---|---|
| 2,414,224 | 1/1947 | Douglas............................ 340/195 |
| 2,457,727 | 12/1948 | Riffenbergh.................... 177/210 X |
| 2,786,669 | 3/1957 | Safford et al................... 340/195 X |
| 2,914,310 | 11/1959 | Bahrs................................. 177/210 |
| 3,203,496 | 8/1965 | Harmon........................... 177/229 X |

*Primary Examiner*—Joseph W. Hartary
*Attorney, Agent, or Firm*—Sughrue, Rothwell, Mion, Zinn & Macpeak

[57] ABSTRACT

A top loading weigh balance is described which comprises a platform supported by a plurality of resilient suspension devices. Each suspension device is associated with a transducer connected in a resonant circuit of an oscillator, the transducers being arranged to vary the output frequency of the oscillator in accordance with the overall change in displacement of the suspension devices, and hence the load.

7 Claims, 3 Drawing Figures

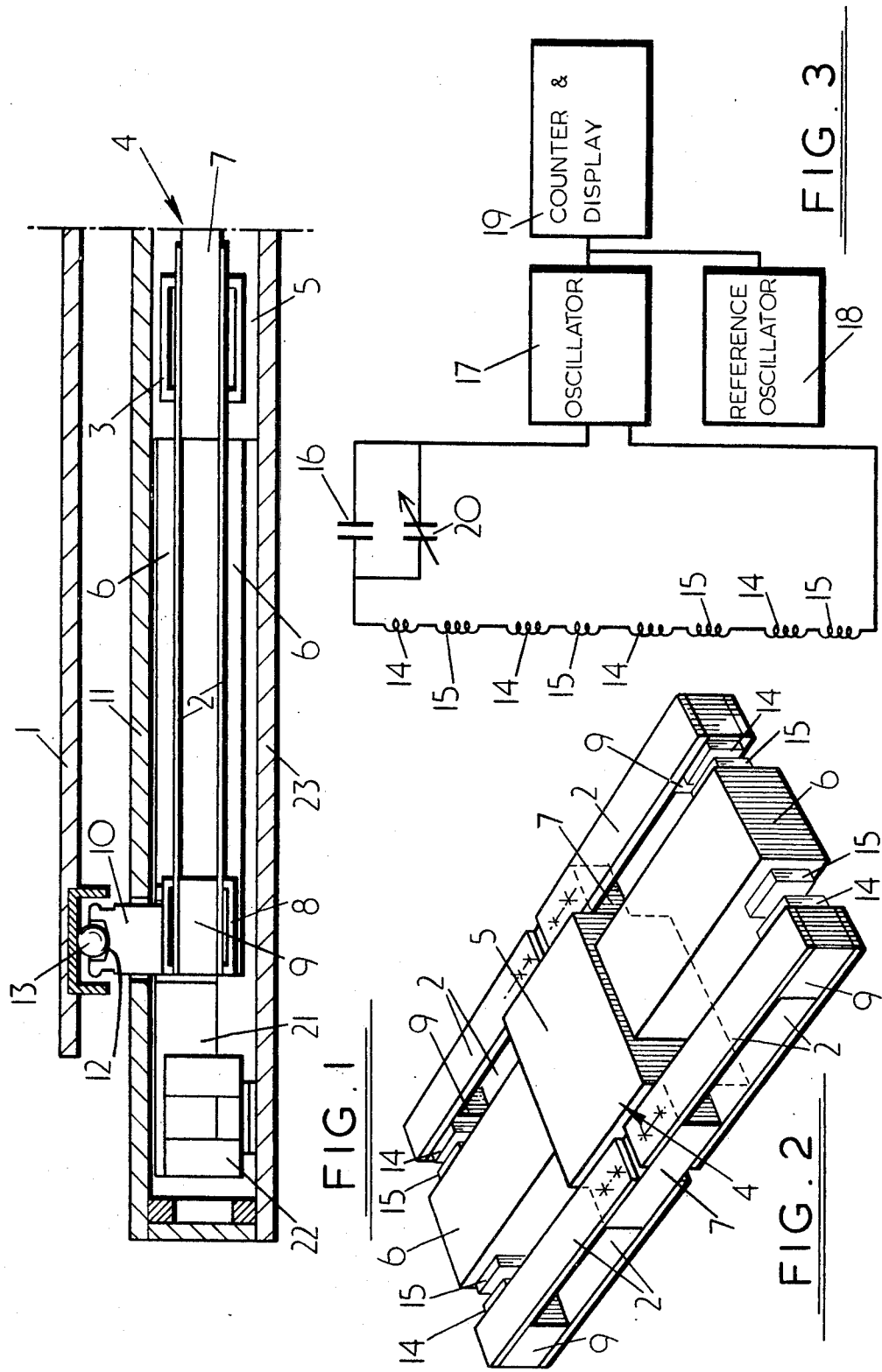

WEIGHING DEVICES

This invention relates to the weighing of infants, for example the weighing of new born babies in incubators.

Hitherto, it has been necessary either to remove temporarily a baby from an incubator in order to weight it, which temporary removal may represent a danger to the baby, or alternatively to weigh an entire incubator plus the baby. Inevitably, the latter weighing arrangement is insensitive because any small change in the weight of the baby may be of the same order as the dead zone error in weighing the incubator.

Such weighing systems also tend to be inaccurate because they do not take into account and allow for impulsive movement of the limbs of the baby.

An object of the present invention is to provide an improved weigh balance suitable for weighing babies.

According to the invention, a top loading weigh balance comprises a platform supported by a plurality of resilient suspension devices, each of which is associated with a transducer connected in a resonant circuit of an oscillator, the transducers being arranged to vary the output frequency of the oscillator in accordance with the overall change in displacement of the suspension devices, and hence the load.

Preferably, each transducer comprises a movable and a fixed inductance coil so arranged that movement of the platform and the suspension device varies the material inductance of the coils.

Preferably the platform is supported by four suspension devices, each of which comprises a double leaf spring which permits vertical displacement without rotation.

The output frequency of the oscillator is conveniently determined by counting the output oscillations over a period of time, for example 1 second, 10 seconds or longer and the count after conversion being displayed digitally as the weight. By this means an average weight is taken over a short period which is sufficient to accommodate oscillatory movement of the weighing platform due to, for example, the impulsive movement of a baby's limbs, without affecting the weighing accuracy.

Advantageously, a further reference oscillator is provided which has a normally non-variable resonant circuit. The outputs of the two oscillators are combined to provide a beat or difference frequency which is representative of the load. This arrangement removes errors which could otherwise arise for example from using the apparatus before the circuitry is warmed up.

An embodiment of the invention will now be described with reference by way of example to the accompanying drawings, in which:

FIG. 1 is a part sectional view of part of a weight balance according to the invention, illustrating details of one of the suspension devices;

FIG. 2 is a perspective view illustrating the construction of the suspension device of FIG. 1; and FIG. 3 is a schematic circuit diagram showing the electrical connection of components illustrated in FIGS. 1 and 2 into an oscillator arrangement.

The weigh balance shown comprises a platform 1 supported from four suspension devices (of which only one is shown in FIG. 1), each comprising a pair of spaced leaf springs 2 clamped at one end by clamping means 3 to a fixed support block 4. The support block 4 (FIG. 2) comprises a massive metal block 5 from which two cantilevers 6 extend, the block 5 suppoting spacer members 7 to which the said one end of the springs 2 are secured. The other ends of the springs 2 are clamped by clamping means 8 (FIG. 1) to a movable suspension block 9 which supports an upstanding pillar 10 extending through a cover plate 11, the pillar 10 having a cupped end 12 to accommodate a ball 13 supporting the platform 1. The ball and cup style support for the platform 1 allows the small horizontal displacement which occurs with a leaf spring system to be accommodated, and also allows tilting of the platform when the load is not centrally disposed.

The clamping means 3 and 8 are omitted from FIG. 2. to clarify the drawing.

Associated with each suspension device is a transducer comprising, as shown in FIG. 2, a moving coil 14 carried by the movable suspension block 9, and a fixed coil 15 supported on the cantilever 6 extending from the block 5. The two coils are connected in series and a change of their relative position appears at the terminals as a change in inductance. The coils 14, 15 of all the suspension devices are connected in series with each other and with a capacitor 16 to form the resonant circuit of an oscillator 17 (as shown in FIG. 3).

A further oscillator 18, the characteristics of which are identical to oscillator 17 but which has a normally non-variable resonant circuit, provides a reference signal which is combined with the output of the oscillator 17 to provide a beat or difference frequency. Variations in the output of oscillator 17 produce corresponding variations in the difference frequency. The double oscillator arrangement removes errors which could otherwise arise for example from using the apparatus before the oscillators have warmed up as the oscillators warm up at the same rate.

Oscillators 17 and 18 are preferably of the bridge-feedback type with thermistor stabilisation of amplitude. The difference frequency provided by oscillator 17 and 18 is measured by a digital frequency meter 19 which, in effect, counts oscillations over a selected time interval. This count, after computation, is displayed as weight on a display panel.

It has been found that of the various geometric shapes possible for the coils, a rectangular shape provides the most linear slope inductance. Preferably the slope inductances of all the transducers, and also the initial inductances at zero displacement, should be identical. To adjust the latter padding inductances (not shown) are provided in association with three of the transducers.

To keep the temperature coefficient of the balance as low as possible, the temperature of the balance enclosure is measured using thermistors (not shown) and an electric signal porportional to temperature is used to vary the value of a voltage dependent capacitor 20 connected in parallel with capacitor 16.

Damping of the balance is provided by a damping vane 21 and permanent magnet 22 at each suspension device. The vane 21 is carried by the movable support block 9 and the magnet 22 is mounted on the base 23 of the apparatus.

The digital display of weight and the operating controls are arranged on an illuminated display panel. Push-buttons for start/stopping the equipment, taring and weighing are interlocked so that they are operative only in a set sequence. Illuminated messages instruct the operator at each stage. Provision is made in the electronic circuitry to store the tare weight, the initial weight value, for example, a baby and the lost weight value in a sequence of weighings. An additional digital display enables, under push-button selection, for the lost weight difference from the initial weight or from the previous weight to be shown.

Provision is also made for adjusting the tare value when items of equipment are added to or subtracted from the weighing platform in the course of caring for the baby.

What is claimed is:

1. A top loading weigh balance, comprising:
   a. a platform,
   b. a plurality of resilient suspension devices supporting the platform,
   c. a plurality of transducers individually associated with the suspension devices, each transducer comprising a movable and a fixed inductance coil arranged so that movement of the platform and the suspension device varies the mutual inductance of the coils,
   d. an oscillator having a resonant circuit associated therewith, and
   e. means connecting the coils of all of the transducers in series with each other in the resonant circuit,
   f. the transducers being arranged to vary the output frequency of the oscillator in accordance with the overall change in displacement of the suspension devices, and hence the load.

2. A top loading weigh balance according to claim 1, comprising four suspension devices.

3. A top loading weigh balance according to claim 1, comprising a further oscillator having a normally non-variable resonant circuit, the outputs of the two oscillators being combined to provide a difference frequency representative of the load.

4. A top loading weigh balance according to claim 1, comprising a counter for counting output oscillations over a predetermined period to determine the load.

5. A top loading weigh balance according to claim 1, wherein at least one of the suspension devices comprises a damping vane and an associated permanent magnet, movement of the platform being damped by a resultant relative movement of the damping vane and the permanent magnet.

6. A top loading weigh balance, comprising:
   a. a platform,
   b. a plurality of resilient suspension devices supporting the platform,
   c. a plurality of transducers individually associated with the suspension devices, each transducer comprising a movable and a fixed rectangular inductance coil arranged so that movement of the platform and the suspension device varies the mutual inductance of the coils,
   d. an oscillator having a resonant circuit associated therewith, and
   e. means connecting the transducers in the resonant circuit,
   f. the transducers being arranged to vary the output frequency of the oscillator in accordance with the overall change in displacement of the suspension devices, and hence the load.

7. A top loading weigh balance, comprising:
   a. a platform,
   b. a plurality of resilient suspension devices supporting the platform, each suspension device comprising a double leaf spring whose leaves are clamped at one end to a common fixed support and at the other end to a respective movable support, each movable support comprising an upstanding member having a cupped upper end receiving a ball on which the platform is supported,
   c. a plurality of transducers individually associated with the suspension devices,
   d. an oscillator having a resonant circuit associated therewith, and
   e. means connecting the transducers in the resonant circuit,
   f. the transducers being arranged to vary the output frequency of the oscillator in accordance with the overall change in displacement of the suspension devices, and hence the load.

* * * * *